(12) United States Patent
He

(10) Patent No.: US 6,913,199 B2
(45) Date of Patent: Jul. 5, 2005

(54) SYSTEM AND METHOD FOR VERIFYING OPTICAL CHARACTER RECOGNITION OF OPTICAL CODE READS

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 10/621,295

(22) Filed: Jul. 17, 2003

(65) Prior Publication Data

US 2004/0118920 A1 Jun. 24, 2004

Related U.S. Application Data

(63) Continuation-in-part of application No. 10/385,941, filed on Mar. 11, 2003.
(60) Provisional application No. 60/434,519, filed on Dec. 18, 2002.

(51) Int. Cl.[7] .................................................. G06K 7/10
(52) U.S. Cl. .................. 235/454; 235/447; 235/462.25
(58) Field of Search ............................. 235/447, 454, 235/462.25–462.29; 382/181, 182, 183

(56) References Cited

U.S. PATENT DOCUMENTS

| | | | |
|---|---|---|---|
| 5,386,103 A | * | 1/1995 | DeBan et al. ................ 235/379 |
| 5,640,002 A | * | 6/1997 | Ruppert et al. ......... 235/462.46 |
| 5,821,523 A | * | 10/1998 | Bunte et al. ............ 235/472.01 |
| 6,056,199 A | * | 5/2000 | Wiklof et al. ........... 235/462.45 |
| 6,264,106 B1 | | 7/2001 | Bridgelall |
| 6,366,696 B1 | * | 4/2002 | Hertz et al. .................. 382/183 |
| 6,545,705 B1 | * | 4/2003 | Sigel et al. .................. 348/157 |
| 6,672,512 B2 | * | 1/2004 | Bridgelall ............... 235/462.46 |
| 6,707,381 B1 | * | 3/2004 | Maloney ................... 340/568.1 |
| 6,761,316 B2 | * | 7/2004 | Bridgelall et al. ...... 235/462.46 |

* cited by examiner

*Primary Examiner*—Michael G. Lee
*Assistant Examiner*—Kimberly D. Nguyen
(74) *Attorney, Agent, or Firm*—Carter, DeLuca, Farrell & Schmidt, LLP

(57) ABSTRACT

A system and method are provided for sensing an image of an object and an optical code associated with the object and generating respective object image data and optical code image data. A database stores a plurality of digital codes and an object image data entry associated with each respective digital code of the plurality of digital codes. A processing unit generates at least one digital code; accesses at least one object image data entry associated with at least one respective stored digital code that substantially matches the respective at least one generated digital code; and compares the object image data with the at least one accessed object image data entry and determines if the comparison results are within a predetermined image recognition certainty threshold.

18 Claims, 10 Drawing Sheets

SYSTEM AND METHOD FOR VERIFYING OPTICAL CHARACTER RECOGNITION OF OPTICAL CODE READS

PRIORITY

This application is a continuation-in-part of U.S. application Ser. No. 10/385,941, filed on Mar. 11, 2003, which claims priority to a U.S. Provisional Application filed on Dec. 18, 2002 and assigned U.S. Provisional application Ser. No. 60/434,519, the contents of both applications are incorporated herein by reference.

BACKGROUND OF THE INVENTION

1. Field of the Invention

This invention relates to verifying read optical indicia, and particularly to verification of optical character recognition of optical code reads using acquired and stored image data.

The invention expands on methodologies and systems used to verify RFID reads as described in U.S. application Ser. No. 10/385,941 titled "SYSTEMS AND METHOD FOR VERIFYING RFID READS" and having a common assignee.

2. Description of the Related Art

Radio frequency identification (RFID) is an area of automatic identification in which a transponder, known generally as a tag, attached to an object communicates wirelessly with an RFID reader. RFID technology is used in a variety of applications including retail, industrial, transportation, tracking, security, animal identification and individual identification. Transfer of data via RFID technology may be used, for example, in indicating the presence of the object, such as in electronic article surveillance (EAS), for obtaining data associated with the object or for identifying the object. In an automatic identification system the tag is typically programmed with unique information, such as encoded data including an identifying code. The reader includes an antenna which emits radio carrier signals to activate the tag and read data from it, and a decoder for decoding the data read. The tag responds to the signal by modulating the carrier signal in accordance with the encoded data.

RFID technology allows for non-contact reading. The RFID reader may be a mobile reader, such as a hand-held reader, or a stationary reader such as a reader located in a tunnel, a door portal or a toll booth. The electromagnetic field generated by the antenna may be constant or activated by actuation means such as a sensor or a trigger. Advantages to RFID technology include non-contact reading without the need for line-of-sight interrogation.

The RFID reader and tag may be configured to operate using inductive coupling, electrostatic coupling, or electromagnetic coupling, in which induction of a current in a coil, induction of a voltage on a plate or a magnetic field, respectively, is used as a means for transferring data and/or power. The tag may be passive, in which case it contains no internal power source and is powered by the carrier signal radiated from the reader, or active, where it uses a battery for a partial or complete source of energy. The operational distance between the transponder and the reader depends on the configuration of the reader and tag used, as well as the frequency and power of the transmitted signals. Also, depending on the configuration of the RFID system, there may not be a need to orient the tag in a particular orientation for successful reading of the tag by the reader.

While the ability of the RFID reader to read a tag from an object while the object is typically located remote from the reader, not necessarily in a line-of-sight of the reader, and without orienting the tag in a particular orientation is advantageous in many applications, it is very possible that the reader might read a tag associated with an object that was not intended to be processed by the reader, resulting in a faulty read. In applications in which the read tag data is further processed, a faulty read will result in processing of faulty data, causing undesirable results, such as inaccurate inventories, charging an incorrect price for a consumer item, processing an unintended library book, charging a toll to an unintended vehicle, etc. Furthermore, noise, due to environmental conditions including moisture in the air and intervening objects, may corrupt data being read by the reader.

Accordingly, it is an object of the present invention to provide a system for verifying that a tag read by RFID methodology corresponds to the tag that was intended to be read and processed.

Also susceptible to faulty reads due to lack of accuracy and reliability are optical code readers that image an optical code and use optical character recognition (OCR) to recognize the code and generate a corresponding textual code. Recognition of each character has an associated error rate. The error rate associated with a string of characters is compounded by the error rate that corresponds to each character in the string. Accuracy in imaging and recognizing the characters of an optical code is affected by a variety of factors, such as illumination of the field of view, background lighting, code design, print quality of the optical code, cleanliness of the optical code and environment, font of the characters, reflectivity of a sticker on which the optical code is printed, code placement, contour of a surface on which the optical code is affixed and flatness of the optical code, image noise and distortion, etc. When the above factors are not ideal, an OCR module performing the OCR processing may have difficulty differentiating between several interpretations of individual characters and may independently select the interpretation representing the most probable textual code.

Accordingly, it is an object of the present invention to provide a system for verification of an optical code read by OCR processing, and/or to efficiently and accurately select a code from a plurality of possible codes corresponding to an imaged code which are generated by OCR processing.

Furthermore, it is an object of the present invention to provide a system and method for using an imaging device for identifying an object bearing an identifying optical code having increased accuracy and decreased processing time.

SUMMARY OF THE INVENTION

In accordance with the present invention, an optical code reader system is provided for reading an optical code and verifying the read optical code. The optical code reader includes an imaging engine having an array of image sensors for sensing an image of an object and an optical code associated with the object and generating respective object image data and optical code image data. A database stores a plurality of digital codes, such as a textual code, and an object image data entry associated with each respective digital code of the plurality of digital codes. The object image data entry associated with a digital code of the plurality of digital codes represents at least one image of an object that is assigned the digital code; and a processing unit is provided for receiving the object image data and the optical code image data from the imaging engine.

The processing unit includes a code generation software module including programmable instructions executable on the processing unit for generating at least one digital code, such as textual code, that corresponds to the optical code image data. The processing unit further includes a database query module including programmable instructions executable on the processing unit for accessing at least one object image data entry stored in the database associated with at least one respective stored digital code that substantially matches the respective at least one generated digital code. The processing unit further includes a comparator module including programmable instructions executable on the processing unit for comparing the generated object image data with the at least one accessed object image data entry for determining if the comparison results are within a predetermined image recognition certainty threshold for verifying the optical code read. If a correlation does not exist, the comparator module determines that an unsuccessful read occurred.

Furthermore, a method is provided for verifying an optical code read, the method including the steps of receiving optical code image data and object image data associated with the optical code and with an object associated with the optical code, respectively; generating at least one digital code, such as a textual code, in accordance with the optical code image data; querying a database for accessing at least one stored object image data entry associated with at least one respective stored digital code, such as a textual code, that substantially matches the respective at least one generated digital code; and comparing the received object image data with the at least one accessed object image data entry for determining if the comparison results are within a predetermined image recognition certainty threshold for verifying the optical code read. If a correlation does not exist, determining that an unsuccessful read occurred.

The present invention further includes a computer-readable medium storing a series of programmable instructions configured for execution by at least one processor for performing the method of the present invention. In addition, the present invention includes a computer data signal embodied in a transmission medium for execution by at least one processor for performing the method of the present invention.

The present invention further includes an RFID reader and imaging system having an imaging device for imaging an object associated with a tag whose RFID code is read by an RFID reader. The imaging device generates image data associated with the imaged object. The system further includes a database storing RFID codes associated with a plurality of objects and complete or extracted image data associated with each stored RFID code. Verification software executable on at least one processor of the system is provided for verifying whether the RFID tag read and processed by the RFID reader and imaging system corresponds to the imaged object.

In accordance with an embodiment of the present invention, verification is performed by comparing the acquired image data or other data associated with the imaged object with the stored image data or other stored data corresponding with the read RFID code. If the acquired image data or other data substantially matches (i.e., within a predetermined image recognition certainty threshold or other system configured parameter) the stored image data or other stored data, then the system verifies that the appropriate RFID code was read. If the acquired image data or other data does not substantially match the stored image data or other stored data, then the system verifies that the appropriate RFID code was not read, or that the system contains an error. For example, the proper RFID code was read, but the corresponding stored image data or other stored data for the read RFID code is incorrect.

In accordance with another embodiment of the present invention an RFID reader and imaging system for verifying an RFID read is provided, in which the system includes RFID reader circuitry for performing the RFID read by receiving RFID tag data from an RFID tag and an imaging engine having an array of image sensors for sensing an image of an object and generating image data. The system further includes a database storing a plurality of RFID codes and image data associated with each respective RFID code of the plurality of RFID codes. The associated image data represents at least one image of at least one object having an RFID tag. The system also includes a processing unit for receiving the RFID tag data from the RFID reader circuitry and the generated image data from the imaging engine. The processing unit includes: an RFID decoding module including programmable instructions executable on the processing unit for decoding the received RFID tag data and generating an RFID code; a database query module including programmable instructions executable on the processing unit for accessing stored image data associated with an RFID code which matches the generated RFID code; and a comparator module including programmable instructions executable on the processing unit for comparing the generated image data with the accessed image data for determining whether the generated image data corresponds to the generated RFID code for verifying the RFID read.

In still another embodiment of the present invention a method is provided for verifying an RFID read. The method includes the steps of receiving an RFID code which was decoded from a set of RFID tag data obtained by reading an RFID tag during an RFID read operation; receiving image data obtained by an imaging operation performed substantially simultaneously with the RFID read operation; querying a database for accessing stored data corresponding to a stored RFID code which matches the received RFID code; and comparing the received image data with the accessed stored data for determining whether the received image data corresponds to the received RFID code. The method may further include receiving a plurality of RFID codes which were decoded from a plurality of respective sets of RFID tag data corresponding to a plurality of respective RFID tags read during the RFID read operation; accessing a set of stored data corresponding to respective stored RFID codes which match respective received RFID codes of the plurality of received RFID codes; and comparing the received image data with the respective sets of accessed data for determining the optimum correlation thereof for determining which received RFID codes of the plurality of received RFID codes corresponds to the received image data, and if a correlation does not exist, determining that an unsuccessful read occurred.

In accordance with another embodiment of the invention, an imaging system for verifying at least one of an optical code read and an RFID read is provided. The imaging system includes RFID reader circuitry for selectably performing the RFID read by receiving RFID tag data from an RFID tag. The imaging system further includes an imaging engine having an image sensor for imaging an image of an object and generating object image data and selectably reading an optical code associated with the object by imaging the optical code and generating optical code image data. Furthermore, the imaging system includes a database storing a plurality of digital code sets having at least one digital code and an object image data entry associated with a digital code set of the plurality of digital code sets, wherein the object image data entry associated with the digital code set of the plurality of digital code sets represents at least one image of an object that is assigned the at least one digital code of the digital code set. The imaging system further includes a processing unit for receiving and processing at least two of the RFID tag data, the object image data, and the optical code image data.

The processing unit includes an RFID decoding module for decoding the RFID tag data and generating at least one first digital code, and a code generation software module for processing the object code image data and generating at least one second digital code. The processing unit further includes a database query module for accessing the database and retrieving at least one object image data entry associated with at least one stored digital code set that includes a digital code that substantially matches at least one of the at least one first digital code and the at least one second digital code, and a comparator module for comparing the object image data with the at least one retrieved object image data entry.

BRIEF DESCRIPTION OF THE DRAWINGS

Various embodiments of the invention will be described herein below with reference to the figures wherein.

DETAILED DESCRIPTION OF THE PREFERRED EMBODIMENTS

The present invention provides processes for verifying whether an RFID code transmitted from an RFID tag affixed to an object was read by an RFID reading device of an RFID reading system, or whether another RFID code corresponding to some other object was read. The other object could be located in the same general vicinity as the object whose RFID tag was intended to be read. Without performing a verification process, the RFID reading system would not be able to ascertain whether the RFID code of the intended RFID tag was read. This leads to several obvious disadvantages in different types of applications.

The present invention also provides an RFID reader and imaging system capable of verifying RFID reads. The system generally includes a processing system having at least one processor capable of executing a set of programmable instructions for performing the various functions of the invention. The system further includes circuitry for interrogating and receiving RFID tag data from an RFID tag affixed to an object and for providing the RFID tag data to the processing system. Image capture circuitry, such as an imaging engine, is also provided to the system of the present invention for capturing an image of the object and providing the image in the form of image data, such as a series of digital signals, to the processing system. The RFID read is performed substantially simultaneously with the imaging of the object.

The at least one processor of the processing system decodes the RFID tag data, processes the image data, accesses a database correlating RFID codes and respective associated image, and determines if the image data generated by the imaging engine corresponds with stored image data associated with the read RFID code for performing the verification process in accordance with the present invention. Accordingly, the system is able to verify whether the RFID tag which was interrogated and read by the RFID reader and imaging system of the present invention corresponds to the object imaged.

It is known in the art to use an imaging engine in an RFID reader. An RFID reader having an imaging engine is described in U.S. Pat. No. 6,264,106, assigned to Symbol Technologies Inc., which is incorporated herein by reference in its entirety. The imaging engine includes a two-dimensional array of cells or photo sensors, such as an area charge coupled (CCD) photo detector, which correspond to image elements or pixels in a field of view of the device, a lens assembly for focusing light incident on the image sensor and associated circuits coupled to the image sensor for producing signals corresponding to a two-dimensional array of pixel information for the imaged field of view.

System Overview

Figure 1:
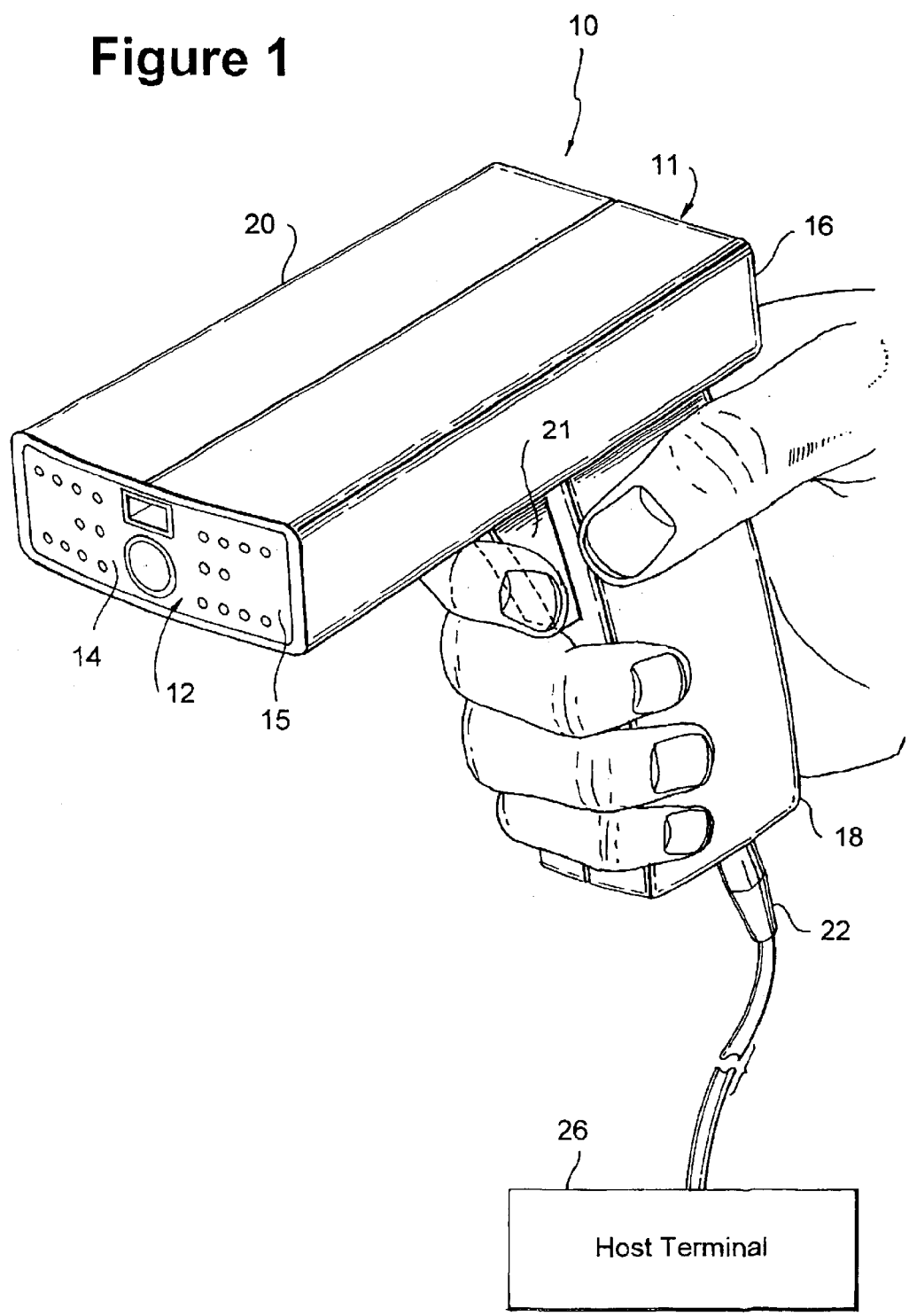
FIG. 1 is a perspective view of an RFID reader and imaging system in accordance with the present invention.

FIG. 1 is a perspective view of an integrated RFID reader and imaging system 10 including a reader 11 having an RFID reader block 12, an imaging engine 14, such as an imaging engine and associated circuitry known in the art, and processing means located internal or external to the reader 11, such as external host terminal 26, which may be used for various data compression, data decompression, decoding, imaging and RFID/image verification functions in accordance with the present invention as described below.

The reader 11 may be housed in one unit, such as the handheld reader shown in FIG. 1 having the RFID reader block 12 and imaging engine 14, or more than one unit having the RFID reader block 12 and/or imaging engine 14 integrated into a checkout counter, a doorway molding, a toll booth, a station on a conveyor belt, etc. Furthermore, the RF reader block 12 and/or imaging engine 14 may be attached to or integrated with a portable, handheld computer device, such as a PDA and handheld computer device available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below.

Furthermore, the reader 11 may include video control circuitry and frame grabbing circuitry for outputting video signals for displaying images on a terminal monitor.

In the exemplary reader 11 shown, the handheld reader 11 includes a housing 16 having a generally elongated handle or handgrip 18 and an upper portion 20 for housing the RFID reader block 12 and the imaging engine 14. The front face 15 of the imaging engine 14 appears at the forward end of the upper portion 20 of the reader 11. The cross-sectional dimensions and overall size of the handle portion 18 are ergonomically configured and sized such that the reader 11 can conveniently be held by the user's hand. Alternatively, the reader 11 may be shaped in the common form-factor of a handheld computer, with the imagine engine 14 looking out of either one end or the bottom of the reader 11, and with the body of the reader 11 designed for allowing the user to grab the complete unit in order to operate it.

The reader 11 is capable of being aimed at an object for receiving and reading a code transmitted from a tag affixed to the object and for simultaneously or successively obtaining and generating image data corresponding to the object. An actuation means, such as a manual trigger 21 is mounted in moving relationship on the handle portion 18 in a forward facing region of the reader 11. The user's forefinger (or possibly thumb, in the case of the alternative form-factor for the reader 11) is typically used to actuate the reader 11 by depressing the trigger 21 for actuating reading of the code transmitted from the tag while either simultaneously or successively imaging the reader's field of view to generate the image data. If the object is located within the field of view, the image data will contain data indicative of the object.

A flexible electrical cable 22 is provided to connect the reader 11 to the host terminal 26. In alternative embodiments, the cable 22 may also provide electrical power to the RFID reader block 12 and/or the imaging engine 14. In a further alternative embodiment, the cable 22 may be partially or fully replaced by wireless communication means such as radio frequency, optical or cellular communication means. In preferred embodiments, the reader 11 includes at least one host processor 302 (see FIG. 3) for processing the image data and/or the RFID tag data, and the processed information is transmitted via cable 22 from the reader 11 to the host terminal 26.

In other embodiments, digital RFID tag data and image data generated by the RFID reader block 12 and the imaging engine 14 are provided to the host terminal 26, where the reader 11 performs no processing or partial processing on the digital image data and digital RFID tag data. The host terminal 26 includes or accesses at least one processor, where the at least one processor may be connected to one or more peripherals or computing devices, such as a video monitor, and/or a network. A data compression module may be provided for compressing the RFID tag data and/or image data for storing within the reader 11 and/or host terminal 26. Compressed RFID tag data and/or image data can be transmitted to the host terminal 26 over electrical cable 22.

The transmission of RFID tag data and/or image data from the reader 11 to the host terminal 26 is initiated by pressing the trigger 21, by actuating another switch on the reader 11, and/or by placing the reader 11 within a cradle having a data output port connected to the host terminal 26. The RFID tag data and/or image data can be transmitted to the host terminal 26 via a hard-wired connection, such as the serial communication port of a personal computer when such a device is used as the host terminal 26, or a wireless connection, such as the IEEE 802.11 standard. The image data may be processed by a data processor of the host terminal 26 and selectively displayed on a monitor (not shown) of the system 10.

Figure 2:
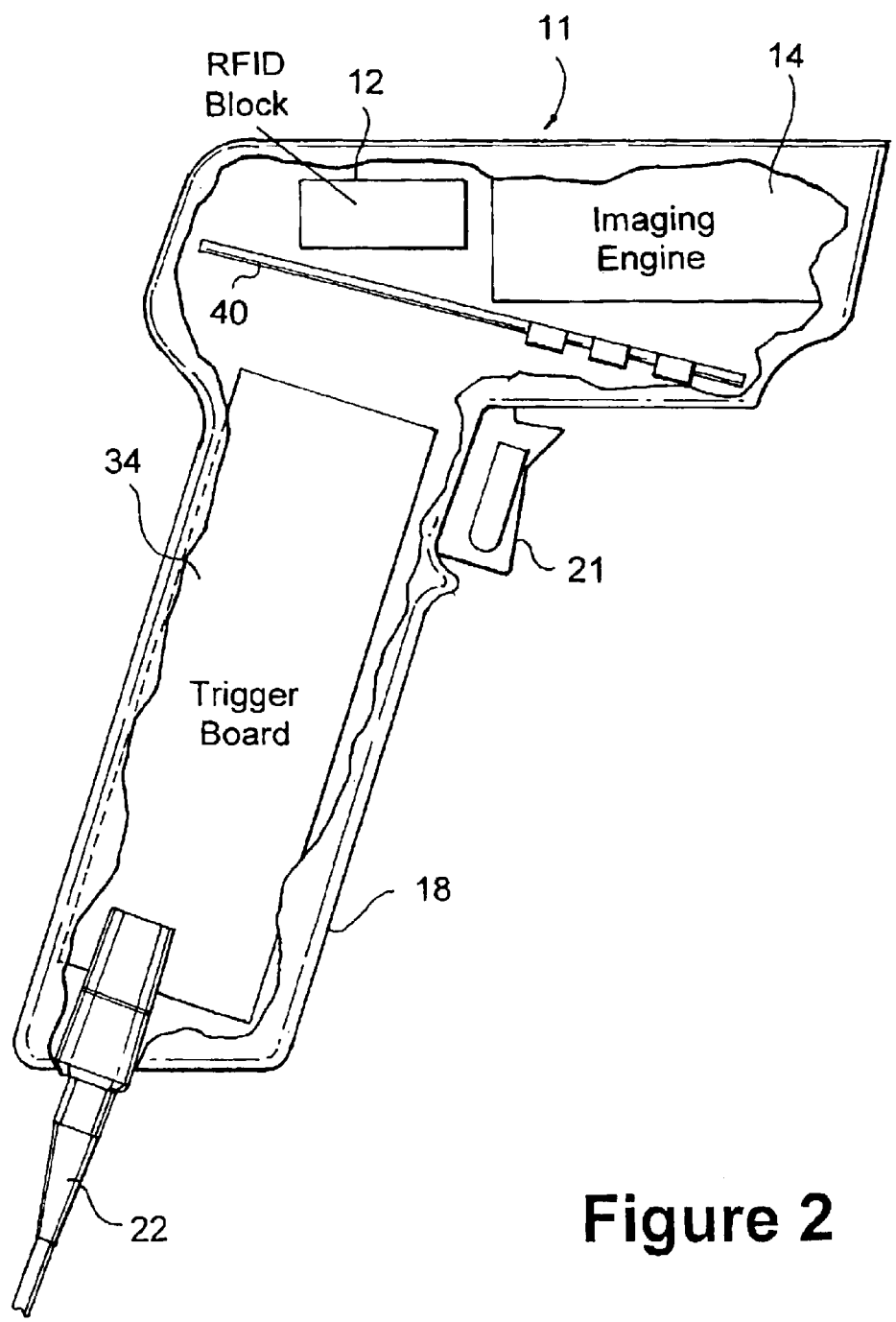
FIG. 2 is a sectional view of the RFID reader and imaging device of the system illustrated by FIG. 1.

FIG. 2 is a sectional view of one embodiment of the reader 11 in accordance with the present invention showing internal components of the reader 11, including the RFID reader block 12, the imaging engine 14, a trigger circuit board 34, and a control and logic circuit (CLC) board 40. The trigger circuit board 34 located in the handle portion 18 of the handheld reader 11 is electrically connected to switch means associated with the trigger 21 of the reader 11 and processes signals indicative of the operator's depressing of the trigger 21 in order to initiate, or continue reading of RFID codes and imaging of an object(s) within the field of view of the reader 11. It is contemplated that actuation means that are known in the art, such as a pedal actuator or an automatic actuator responsive to a sensed or processed signal may be included in addition to or instead of trigger 21 and trigger board 34. It is further contemplated that trigger 21 includes first and second triggers for independently or in combination actuating reading of the RFID tag code and imaging the object presented distally from the imaging engine 14 of the reader 11. A switch may also be provided to the reader 11 to disable the RFID reader block 12 and/or the imaging engine 14.

The CLC board 40, or portions thereof, may alternatively be provided externally from the reader 11, such as in the host terminal 26. In circumstances where the reader 11 of FIG. 2 is to be retrofitted from a laser line scan engine to an imaging engine 14, the imaging engine 14, RFID module and CLC board 40 can be inserted in place of the line scan engine and circuit board 40 in the reader 11. In this way previously designed toolings, housings and host devices may be employed and provide continuity in upgrading the code reading system. In preferred embodiments, the imaging engine 14 is less than two cubic inches in volume and is dimensioned to replace a moving laser beam scanning engine in a handheld optical code scanner, such as an SE1200 form factor scanning engine.

In alternate embodiments, the reader 11 includes a radio frequency board and an antenna which provide a mobile radio link to one or more data terminals, such as the host terminal 26. Electrical power for the reader 11 is provided via the host terminal 26 or by a rechargeable battery within the reader 11. An infrared data interface (IRDA) or multi-contact shoe may also be provided to communicate data between the reader 11 and an external receiver or docking device, respectively. Compressed tag and/or image data may be transmitted to the host terminal 26 via a radio frequency link, IR communication link, or direct contact with the docking device.

It will be understood that aspects of the present invention are also applicable to RFID reader modules 12 and imaging engines 14 which are located in separate units which are in data communication with the host terminal 26. The RFID reader block 12 or the imaging engine 14 may alternatively be incorporated into a computer terminal in a fixed location or in a rotating turret. Such arrangements are particularly well adapted for using the imaging engine 14 as part of a video phone system which also uses the display, processing and I/O capabilities of the computer terminal.

It is contemplated that more than one frame of image data is generated by the imaging engine 14, either by generating still images or video data where the object is stationary or rotated, or more than one device having an imaging engine is provided. Accordingly, the object may be imaged from one or more angles for obtaining image data corresponding to various sides, views or faces of the object for providing more reliable verification results.

Figure 3:
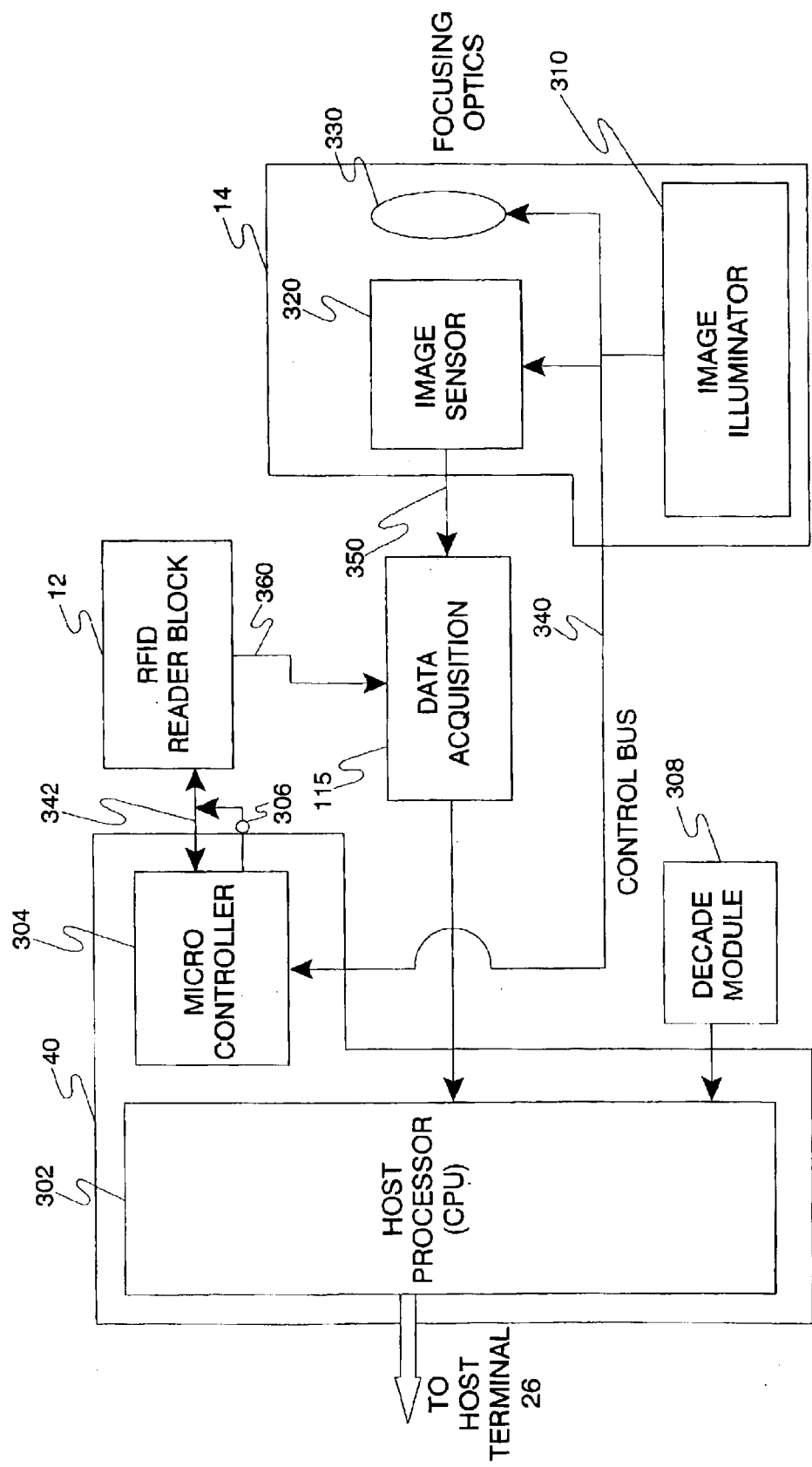
FIG. 3 is a block diagram of the RFID reader and imaging system illustrated by FIG. 1.

With respect to FIG. 3, an exemplary CLC board 40 is shown to include a host processor (CPU) 302, a microcontroller 304, and a crystal 306. An image illuminator 310 (optionally included) illuminates the field of view of the reader 11 using one or more illumination sources, such as laser LEDs or conventional lighting. Each sensor of an array of sensors included in image sensor 320 receives a reflected beam via focusing optics 330 and transmits an analog pixel signal 350 to data acquisition circuit 115. The RFID reader block 12 provides analog RFID tag data 360 to the data acquisition circuit 115. The data acquisition circuit 115 provides digital RFID tag and image data to the processor 302. A decode module 308, which is a software module executable on the processor 302, or alternatively on the host terminal 26, is provided for decoding the RFID tag data provided to the microprocessor and generating a corresponding RFID code, where the decode module 308 is stored on a storage medium (not shown) accessible by the processor, such as a DRAM or flash memory of the CLC board 40 or storage external to the reader 11, such as hard drive, floppy or CD-ROM.

Operation of the imaging engine 14 and the RFID reader block 12 is controlled by the microcontroller 304 via control buses 340 and 342, with synchronization provided by crystal 306. Trigger board 34 is connected to control unit 40 for providing actuation signals for actuating an RFID read and/or imaging process.

Figure 4:
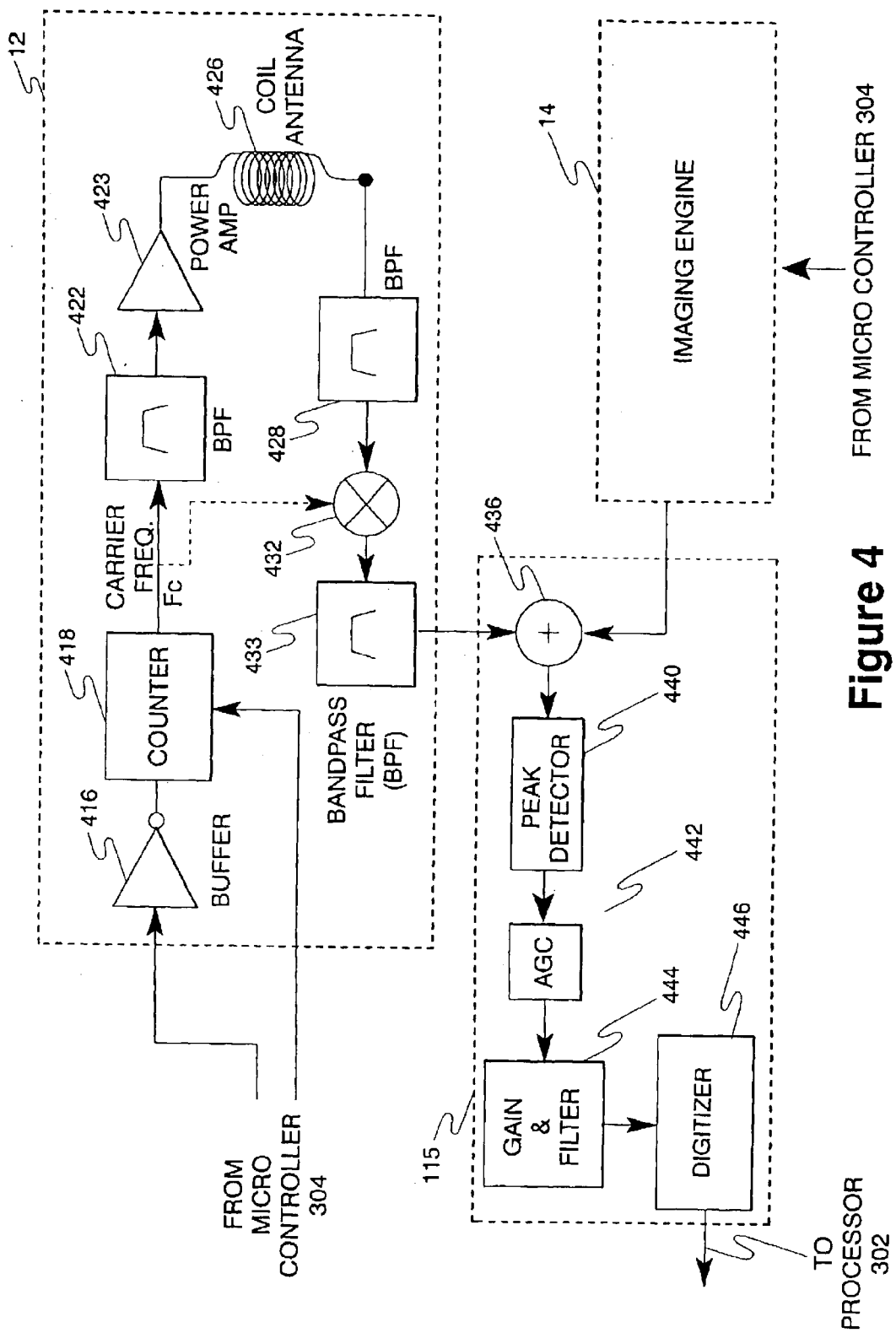
FIG. 4 is a functional block diagram of imaging engine, an RFID module and data acquisition circuitry in accordance with an embodiment of the present invention.

A functional block diagram of the RFID reader block 12, the imaging engine 14 and the data acquisition circuit 115 are shown in FIG. 4. The RFID reader block 12 detects the presence of an RFID tag and performs pre-processing on signals received from the RFID tag as follows. Amplifier 416 receives, amplifies and processes a clock signal from the CLC board 40 and provides a signal to counter 418. The CLC board 40 also provides an RFID enable signal to the counter 418 which enables the RFID reader block 12. Thereafter, the counter signal is preferably filtered by bandpass filter 422, amplified by power amplifier 423 and then propagated as an RF signal via antenna 426. The antenna 426 then determines, either through inductive coupling, through RF propagation, or other suitable RF method, whether there is an RFID tag in the RF field propagated by the antenna 426, and, if so, the characteristics of the RFID tag.

Thereafter, the antenna 426 transmits a data signal based on the RF information to a bandpass filter 428. The bandpass filter 428 then transmits the signal to multiplier 432, which samples the signal at a rate preferably controlled by the counter 418 and then transmits the sampled signal to another bandpass filter 433 which further pre-processes the data signal and transmits it to adder 436 of the data acquisition circuit 115. The particular electronics for detecting an RFID tag and pre-processing the data signal are well-known in the art and are not limited to the particular embodiment shown in FIG. 4.

Each signal from the RFID reader block 12 and imaging engine 14 is preferably transmitted to element 440 in the exemplary data acquisition circuit 115 shown. Element 440 can preferably be a peak detector, comparator, differentiator or other suitable device for determining the magnitude and duration of the peaks of the incoming signal. The signal is then further processed by automatic gain control 442, gain and filter block 444, and digitizer 446, after which it is transmitted as a suitable digital signal to the processor 302. The signal may be transmitted to the processor 302 by a suitable interface for transmitting digital signals.

In one embodiment, the imaging engine 14 includes circuitry for processing image signals output by the array of sensors of the image sensor 320, such as, for example, buffering, amplifying, filtering, and digitizing the signals. In this embodiment, interface circuitry is included for interfacing the imaging engine 14 and the processor 302 for direct transmission of these image signals to the processor 302 for processing thereof.

By utilizing a single CLC board 40, a single data acquisition circuit 115, a single interface between the processor 302 and microcontroller 304, and a single digital signal path between the data acquisition circuit 115 and the CLC board 40, the imaging/RFID circuitry can be substantially reduced in size. At this reduced size, the circuitry can be formed to fit into space which is currently allocated for readers that provide only scanning capabilities, e.g., a reader When a simultaneous RFID read and imaging process is requested by an operator, the RFID reader block 12 and the imaging engine 14 are controlled by the CLC circuit 40 to be activated in succession, where the data acquisition circuit 115 receives and processes the signals therefrom successively. The CLC circuit 40 receives the image and RFID tag data successively from the data acquisition 115 and correlates the received data for verifying if the received image data corresponds to the received RFID tag data. Alternatively, the CLC circuit 40 activates the RFID reader block 12 and the imaging engine 14 simultaneously, where the signals output by at least one of the RFID reader block 12 and the imaging engine 14 are buffered and provided successively to the data acquisition circuit 115.

In an alternate embodiment of the invention, the CLC circuit 40 controls the RFID reader block 12 and imaging engine 14 to simultaneously image an object and process a signal transmitted by an RFID tag. This may prove useful, for example, for applications in which speed is a critical factor in processing the signals and verifying that the RFID tag data corresponds to the image data, such as in an assembly line application.

Figure 5:
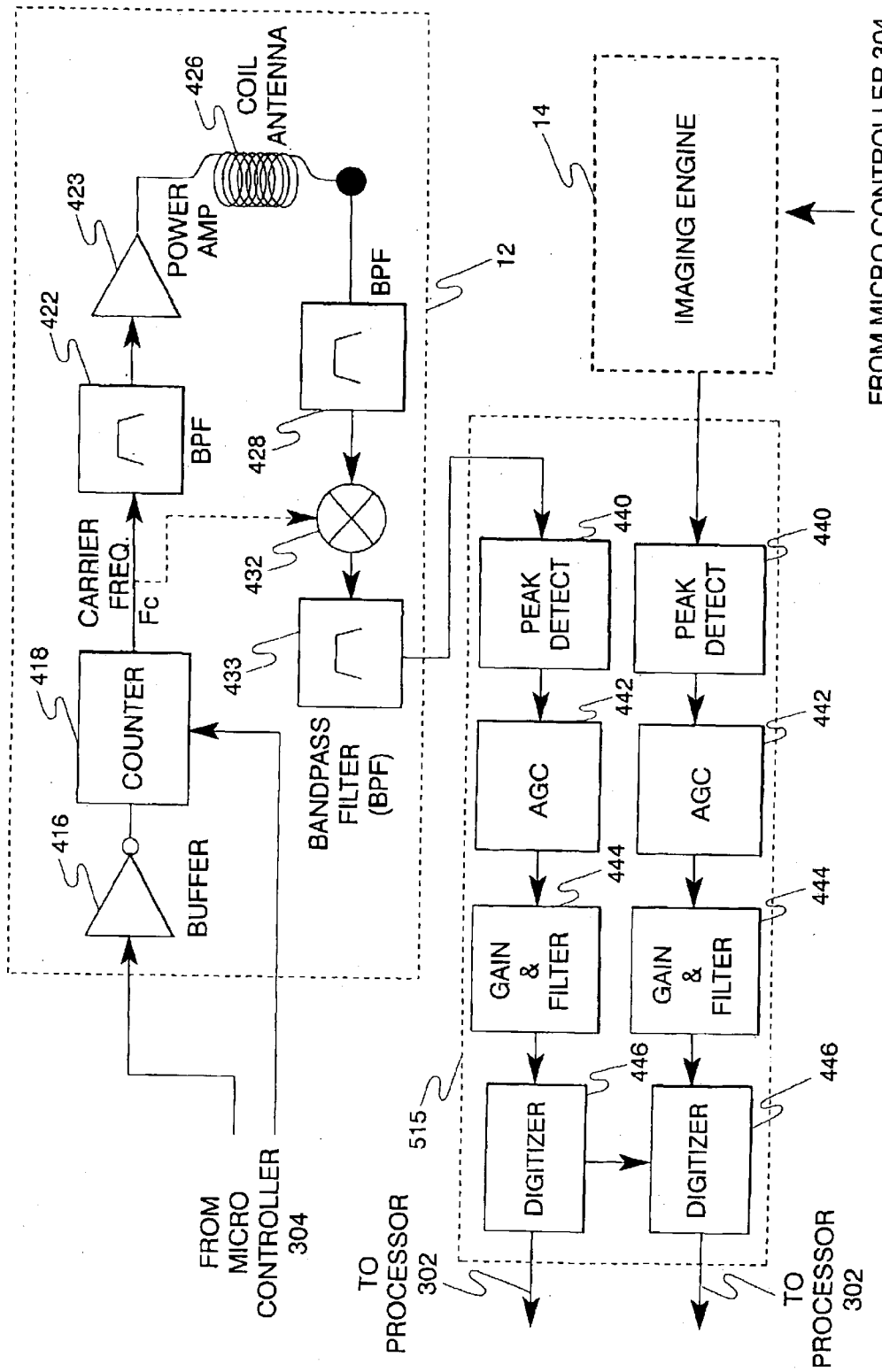
FIG. 5 is a functional block diagram of the imaging engine, the RFID module and the data acquisition circuitry in accordance with another embodiment of the present invention.

FIG. 5 shows a block diagram of one embodiment of a simultaneous imaging/RFID circuit that is capable of simultaneously processing an RFID signal generated by the RFID reader block 12 and an imaging signal generated by the imaging engine 14 having a data acquisition circuit 515 which includes two separate data transfer paths. Each path preferably includes peak detector 440, automatic gain control 442, gain and filter block 444, and digitizer 446. This particular embodiment eliminates the need for element 436 because the data signals from each of the imaging engine 14 and the RFID block 12 are transmitted directly to peak detector 440. The CLC board 40 may be configured to receive two signals simultaneously through the data acquisition circuit 515.

Using RFID technology, it is possible to read RFID tags that are not in a line of sight of the reader 11. For example, a reader 11 may be used in a supermarket aisle to obtain a price on a particular item, however a plurality of grocery items provided with RFID tags may be in the vicinity. Thus, when the reader 11 is operated to perform an RFID and image verification operation, a plurality of RFID tags may be read while the desired object is imaged. Accordingly, the decoder module 308 generates a plurality of RFID codes corresponding to respective read RFID tags, while only one of the RFID codes corresponds to the RFID tag that corresponds to the desired item. The imaging engine 14 generates image data that corresponds to the desired object which it is aimed at, i.e., lies within the field of view of the reader 11.

Verification Processing

Figure 6:
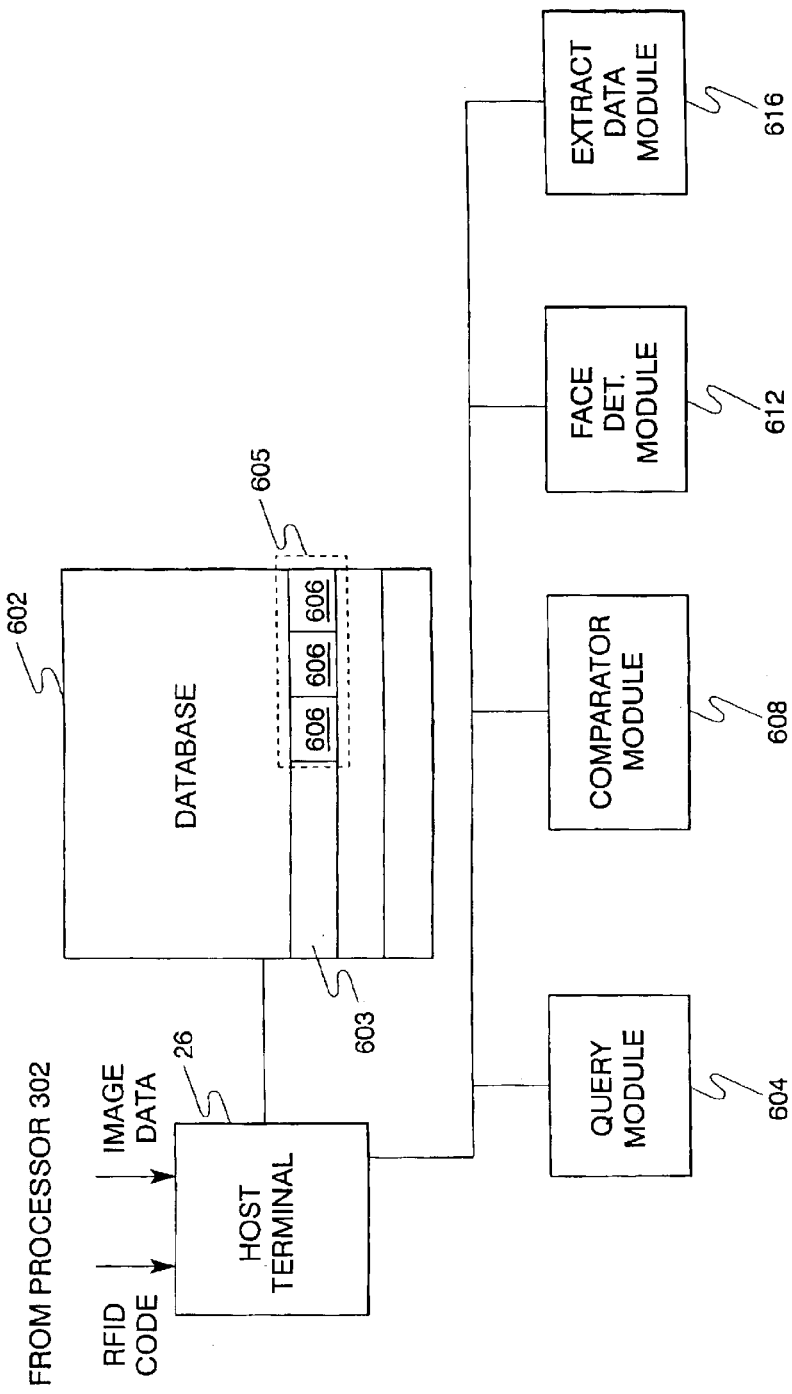
FIG. 6 is a block diagram of a host terminal, database module and associate software modules of the RFID reader and imaging system of FIG. 1.

Preferably, verification processing is performed by a processor of the host terminal 26. Verification processing may alternatively be performed partially or entirely by a processor, such as processor 302, having access to database 602, where the processor and/or the database 602 is housed within the reader 11. With reference to FIG. 6, the host terminal 26 receives one or more RFID codes, where one of the RFID codes corresponds to the desired object, and image data corresponding to the desired object from the processor 302. The host terminal 26 has access to database 602 which stores a plurality of RFID codes 603 and respective associated image data 605 or links thereto, where the associated image data 605 represents an object; that is, the object assigned the respective RFID code.

The stored image data 605 preferably includes one or more image entries 606, such as an entry for each side, view, or face (or major faces (e.g., front and back)) of the object. The resolution of the stored image data 605 may be comparable to, greater than or less than the resolution of the image data generated by the reader 11. The image entries 606 may include, in addition to or instead of image data, data indicative of the object, such as dimensions of the object, text identifying the object and/or included on a face of the object, and extractions or derivations from the actual image data, such as quantitative data or qualitative data derived or extracted from actual image data by an extraction algorithm, such as an algorithm for performing a color analysis (such as for obtaining a breakdown of number of pixels per color, dominant color, color ratios, etc.), a reflectivity analysis, a shape analysis, a texture analysis, light contrast analysis or edge detection, for determining one or more parameters or characteristics of the object being imaged. The extracted data stored may be selected pixel data of the received image data, such as with minimal or no background image data, or sampled pixel data.

A query module 604 and a comparator module 608 are provided. Each of the modules 604, 608 includes a set of programmable instructions capable of being executed by a processor, such as the processor 302. A face determination module 612 and/or an extract data module 616 are further provided having additional sets of programmable instructions capable of being executed by a processor, such as the processor 302, for performing additional functions in accordance with the present invention.

The query module 604 queries the database 602 for retrieving image data 605 corresponding to the received one or more RFID codes, and accesses and/or retrieves stored data, preferably image data, corresponding to a stored RFID code that matches each received RFID code. The comparator module 608 compares received image data and retrieved (accessed) image data 605 for determining if a substantial match exists therebetween and for determining if the RFID code read corresponds to object that was imaged.

When retrieving stored data corresponding to more than one stored RFID code matching the respective received RFID codes, the comparator module 608 compares the received image data with the retrieved data associated with each of the respective matching RFID codes to determine the best correlation thereof in accordance with correlation criteria. Accordingly, the stored RFID code that corresponds to the best correlating retrieved data is determined to best correspond with the received image data. Furthermore, the received RFID code that matches the best corresponding stored RFID code is determined to be the received RFID code that best corresponds to the desired object. If a correlation doesn't exist, a determination is made that an unsuccessful read, such as a misread, a no decode, a no read, etc., occurred.

The face determination module 612 includes an algorithm for analyzing the received image data (or, when there is more than one image, each respective image thereof) to determine which image data corresponds to a face(s) of the object best imaged by the reader 11, i.e., corresponds to a dominant face of the object imaged by the reader 11, and discards the image data that does not correspond to the imaged face(s).

The extract data module 616 includes an extraction algorithm to extract information from the received image data, such as by extracting or selecting pixel data corresponding to the received image data, selecting pixel data with minimal or no background image data, selecting data associated with the best imaged face, discarding pixel data of border areas, and sampling the pixel data. The extract data module 616 also uses an extraction algorithm for deriving one or more parameters or characteristics of the object being imaged. The extraction algorithm used is similar to the extraction algorithm previously used for deriving or extracting the image data 605 stored in the database 602. For instances in which the extraction of data is a function of the distance between the object and the image sensor 320, such as when the extraction data includes determination of the dimensions of the object, the distance may be determined, such as by using laser aiming means, with a class of algorithms commonly referred to as parallax ranging or triangulation, as known in the art.

In an alternate embodiment, such as when the retrieved image data 605 is not extracted data, the extract data module 616 performs an extraction algorithm on both the retrieved image data 605 and the received image data. In one embodiment, the comparator module 608 performs sufficient recognition processing for recognizing similarities between the received image data and the retrieved image data 605, such that the extract data module 616 and the face determination module 612 can be omitted.

It is noted that the series of programmable instructions corresponding to one or more of the modules described herein can be stored on a computer-readable medium, such as a nonvolatile memory (e.g., flash) unit, a CD, smart card, 3.5" diskette, etc.

Figure 7:
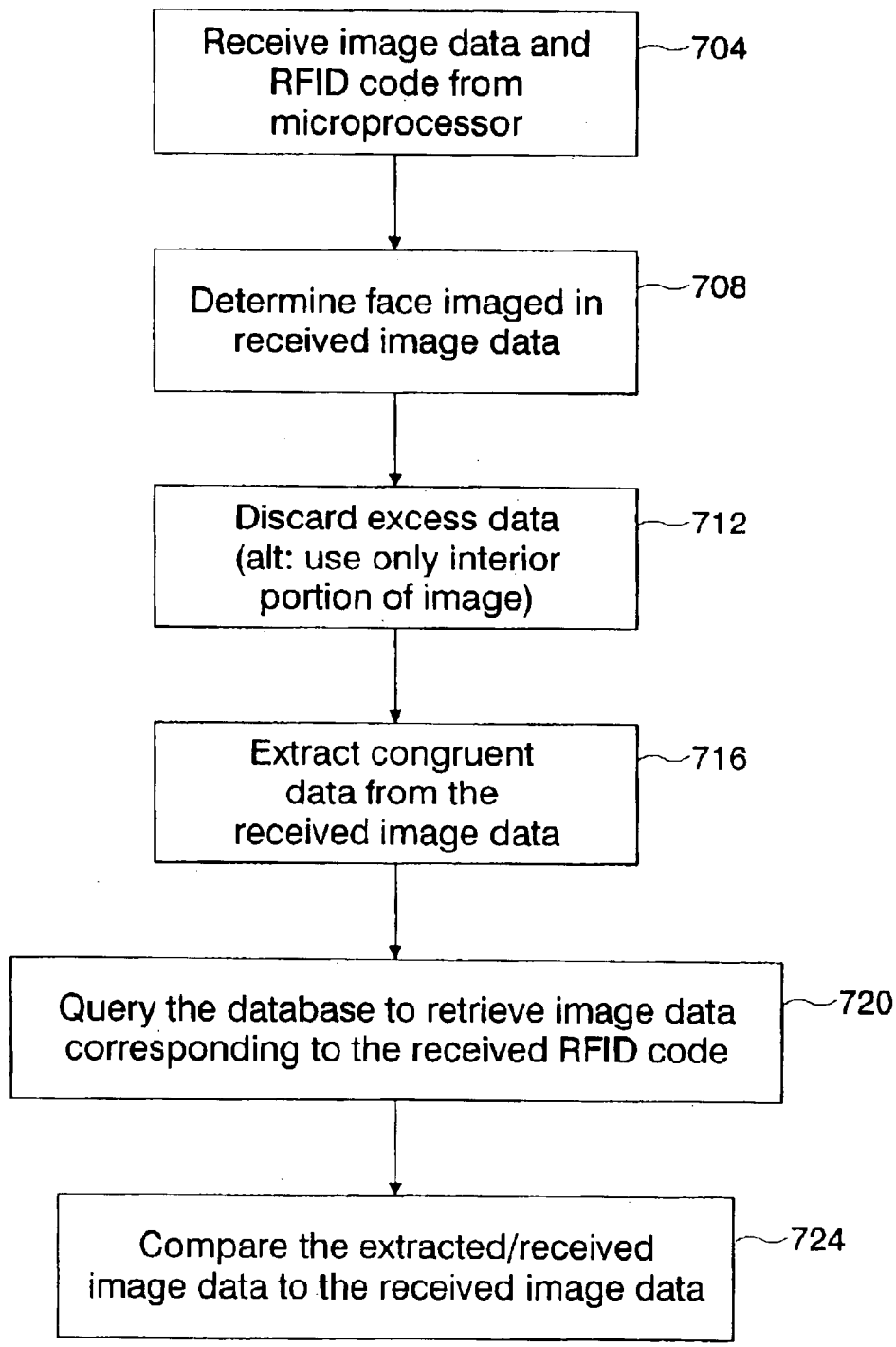
FIG. 7 illustrates a flowchart showing an exemplary operation of the RFID reader and imaging system illustrated by FIG. 1.

An exemplary operation of the verification process will now be described with reference to the flowchart shown in FIG. 7. At step 704, the host terminal 26 receives image data and an RFID code from the processor 302. At step 708, the face determination module 612 is executed to extract the dominant face in the image (or respective images) included in the received image data. At step 712, the extract data module 616 discards excess data from the received image data. At step 716, the extract data module 616 extracts data from the received image data using an algorithm for extracting data which is congruent with the image data 605 stored in the database 602. At step 720, the query module 604 queries the database 602 to retrieve image data 605 corresponding to the received RFID code. At step 724, the comparator module 608 compares the extracted and/or received image data to the retrieved image data 605 (or other stored data).

The extracted and/or received image data is preferably compared to the stored image data 605 corresponding to more than one respective face until a substantial match is found between the extracted and/or received image data and the stored image data 605. The degree of similarity or level of confidence required for a match may be predetermined or selectively weighted (i.e., within a predetermined image recognition certainty threshold or other system configured parameter).

If a substantial match does not exist, the comparator module 608 determines that the wrong RFID tag code was read, perhaps an RFID tag code corresponding to another object in the same vicinity as the object whose RFID tag was intended to be read. The comparator module 608 may also determine that the proper RFID tag code was read, but the database 602 incorrectly correlates the read RFID tag code with at least one respective stored image of the stored image data 605. If a match does exist, the comparator module 608 determines that the RFID tag code read corresponds to the object imaged.

Exemplary applications for the verification process include imaging a license plate on a car having an RFID tag passing through an RFID reader booth, extracting image data corresponding to the license plate, performing optical character recognition (OCR) on the extracted image data for determining the characters on the license plate, and comparing the license plate associated with the RFID code read and stored within the database 602 with the retrieved and extracted characters. Similarly, character data may be extracted and recognized by OCR optical codes, such as character codes on stickers having RFID tags affixed to produce or other products, as well as characters printed on packaging or badges having an RFID tag, such as a name on a security badge.

In a further security application, the verification process acquires imaged biometric features, such as fingerprints, retina prints, markings on animal hide, or face maps, and compares these acquired images with corresponding stored image data or other data stored in the database 602. In a retail application, such as at a grocery store, a packaged product having an affixed RFID tag may be presented to the reader 11. The reader 11 reads the affixed RFID tag to generate an RFID code and image a face of the package to generate image data. The extract data module 616 processes the image data to obtain data corresponding to one face. The database 602 may have six faces stored in association with the code that correlates to the read RFID tag data. The comparator module 608 compares the image data corresponding to the image face with each of the stored six faces until a substantial match is found. If a substantial match is not found, it is determined that the read RFID tag does not correspond to the package that was imaged, or there exists a system error.

In another embodiment still, the reader 11 is provided with imaging engine 14, however the RFID reader block 12 is not included, or alternatively, is included, but not activated. The imaging engine 14 of reader 11 images an object and an optical code associated with the object. The object is identified using a combination of optical code recognition (OCR) software and image verification software. The code imaged is an optical code, such as a barcode or a string of characters or a combination thereof, where each character is selected from a predetermined set of characters, such as alphanumeric characters and other symbols (e.g., a logo, a symbol or a portion thereof, line or space of a barcode). The optical code is associated with and preferably affixed to an object, such as printed on a sticker or tag that is affixed to the object, where the object is an item, such as a produce item, a nonperishable grocery item, an item on an assembly line, a garment, etc. . .

In operation the reader 11 is brought into proximity of the object and the imaging engine 14 captures an image of the object and the optical code associated with the object and generates respective corresponding object image data and optical code image data. The optical code image data generated by the imaging engine 14 are provided to a processor 302 and/or the host terminal 26 for processing by an optical character recognition (OCR) software module.

The OCR module is a software module executable on the processor 302, or alternatively on the host terminal 26.

The OCR module performs character recognition processing on the optical code image data received from the imaging engine 14, and generates at least one possible digital code, such as a textual code, that corresponds to the imaged optical code. The OCR module is generally capable of recognizing individual symbols and/or characters included in a string of symbols and/or characters that are included in the imaged optical code, where the individual recognized symbols and/or characters belong to a predetermined set of symbols and/or characters. The OCR module generates one or more possible textual characters that correspond to individual symbol(s) and/or character(s) of the imaged optical code. The OCR module generates at least one textual code associated with the optical code image data, where each textual code includes a string of generated textual characters that correspond to the respective symbols and/or characters included in the string of symbols and/or characters included in the imaged optical code. More than one possible textual code is generated by the OCR module when more than one possible textual characters are generated for one or more symbols and/or characters of the optical code image data.

The at least one possible textual code generated by the OCR module is provided to an image verification module that is a software verification module executable on the processor 302, or alternatively on the host terminal 26. The image verification module accesses database 602, where database 602 stores a plurality of digital codes, such as textual codes, and image data, where preferably the digital codes are indexes to the image data. The textual codes may be the same as the stored RFID codes, or in addition to the stored RFID codes. The image verification module compares respective stored image data entries associated with stored textual codes that match generated textual codes of the generated at least one possible textual code to the image data received from the image engine 14 until it determines which stored image data entry correlates or best correlates to the received image data in accordance with correlation criteria of the image verification software.

The textual code associated with the correlated or best correlated stored image data entry is determined to be the textual code that is associated with the object for identifying the object. If none of the stored image data entries compared to the received image data correlates to the received image data, then the image verification software determines that an unsuccessful read, such as a misread, a no decode, a no read, etc., has occurred.

The imaging of the object and the optical code may be performed by performing two imaging operations for individually imaging and generating the object image data and the optical code image data. In another embodiment the object and code are imaged in one imaging operation and the optical code image data may be extracted from the object data. Imaging of the object and optical code may be performed simultaneously or sequentially. First and second image engines may be provided for imaging the object and optical code, respectively.

Figure 8:
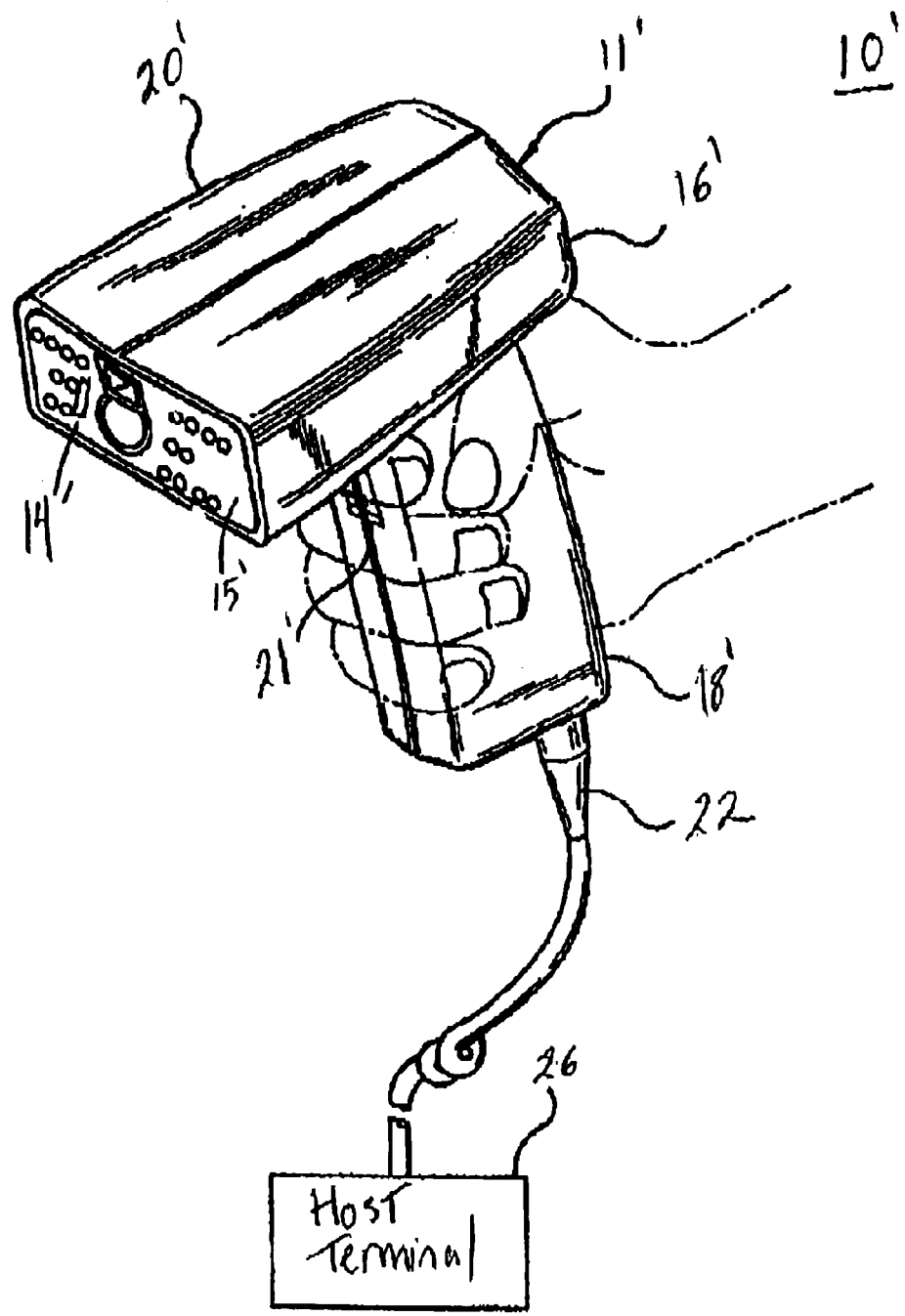
FIG. 8 is a perspective view of an exemplary optical code reader system having an optical code reader including an imaging engine in accordance with another embodiment of the present invention.

With reference to FIG. 8, a perspective view is shown of an exemplary optical code reader system 10' in accordance with a preferred embodiment of the present invention implementing optical code recognition and imaging verification. An optical code reader 11' is shown having at least one imaging engine 14', where the reader 11' is capable of being aimed at an object for simultaneously or successively obtaining and generating image data corresponding to an object and an optical code associated with the object. The optical code reader 11' is preferably connected to host terminal 26 via cable 22. Optical code reader 11' as shown is similar to optical code reader 11 of FIG. 1, however optical code reader 11' preferably does not include an RFID module. The exemplary optical code reader 11' includes a housing 16' having a generally elongated handle or handgrip 18' and an upper portion 20' for housing the imaging engine 14'. The front face 15' of the imaging engine 14' appears at the forward end of the upper portion 20' of the reader 11'. An actuation means, such as a manual trigger 21' is provided for actuating the optical code reader 11' to image at least one of an optical code and an object. Similarly to reader 11, in circumstances where the reader 11' is to be retrofitted from a laser line scan engine to an imaging engine 14', the imaging engine 14', and associated circuitry (not shown) can be inserted in place of the line scan engine and circuit board.

The reader 11' may be housed in one unit, such as the handheld reader shown in FIG. 8 having the imaging engine 14', or more than one unit having the imaging engine 14' integrated into a checkout counter, a doorway molding, a toll booth, a station on a conveyor belt, a computer terminal, a rotating turret, etc. Furthermore, at least a portion of the reader 11' may be attached to or integrated with a portable, handheld computer device, such as a PDA and a handheld computer device available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below. Furthermore, the reader 11' may include video control circuitry and frame grabbing circuitry for outputting video signals for displaying images on a terminal monitor. It will be understood that aspects of the present invention are also applicable to an optical reader 11' having more than one imaging engine 14' which are located in a single unit or separate units.

In alternative embodiments, the cable 22' may also provide electrical power to the imaging engine 14'. In a further alternative embodiment, the cable 22' may be partially or fully replaced by wireless communication means such as radio frequency, optical or cellular communication means. The image data may be processed within the reader 11' and/or provided to the host terminal 26, where the reader 11' performs no processing or partial processing on the image data. The host terminal 26 includes or accesses at least one processor, where the at least one processor may be connected to one or more peripherals or computing devices, such as a video monitor, and/or a network. A data compression module may be provided for compressing the image data for storage within the reader 11' and/or host terminal 26. Compressed image data can be transmitted to the host terminal 26 over electrical cable 22'.

The transmission of image data from the reader 11' to the host terminal 26 may be automatic or initiated by pressing an actuation means, such as trigger 21', and/or by placing the reader 11' within a cradle having a data output port connected to the host terminal 26. The image data can be transmitted to the host terminal 26 via a hard-wired connection, such as the serial communication port of a personal computer when such a device is used as the host terminal 26, or a wireless connection, such as the IEEE 802.11 standard. The image data may be processed by a data processor of the host terminal 26 and selectively displayed on a monitor (not shown) of the system 10'.

In alternate embodiments, the reader 11' includes a radio frequency board and an antenna which provide a mobile radio link to one or more data terminals, such as the host terminal 26. Electrical power for the reader 11' is provided via the host terminal 26 or by a rechargeable battery within the reader 11'. An infrared data interface (IRDA) or multicontact shoe may also be provided to communicate data between the reader 11' and an external receiver or docking device, respectively. Compressed tag and/or image data may be transmitted to the host terminal 26 via a radio frequency link, IR communication link, or direct contact with the docking device.

It is contemplated that more than one frame of image data is generated by the imaging engine 14', either by generating still images or video data where the object is stationary or moved, e.g., rotated, and/or the at least a portion of the imaging engine 14' is stationary or moved. Accordingly, the object may be imaged from one or more angles for obtaining image data corresponding to various sides, views or faces of the object for providing more reliable verification results.

Figure 9:
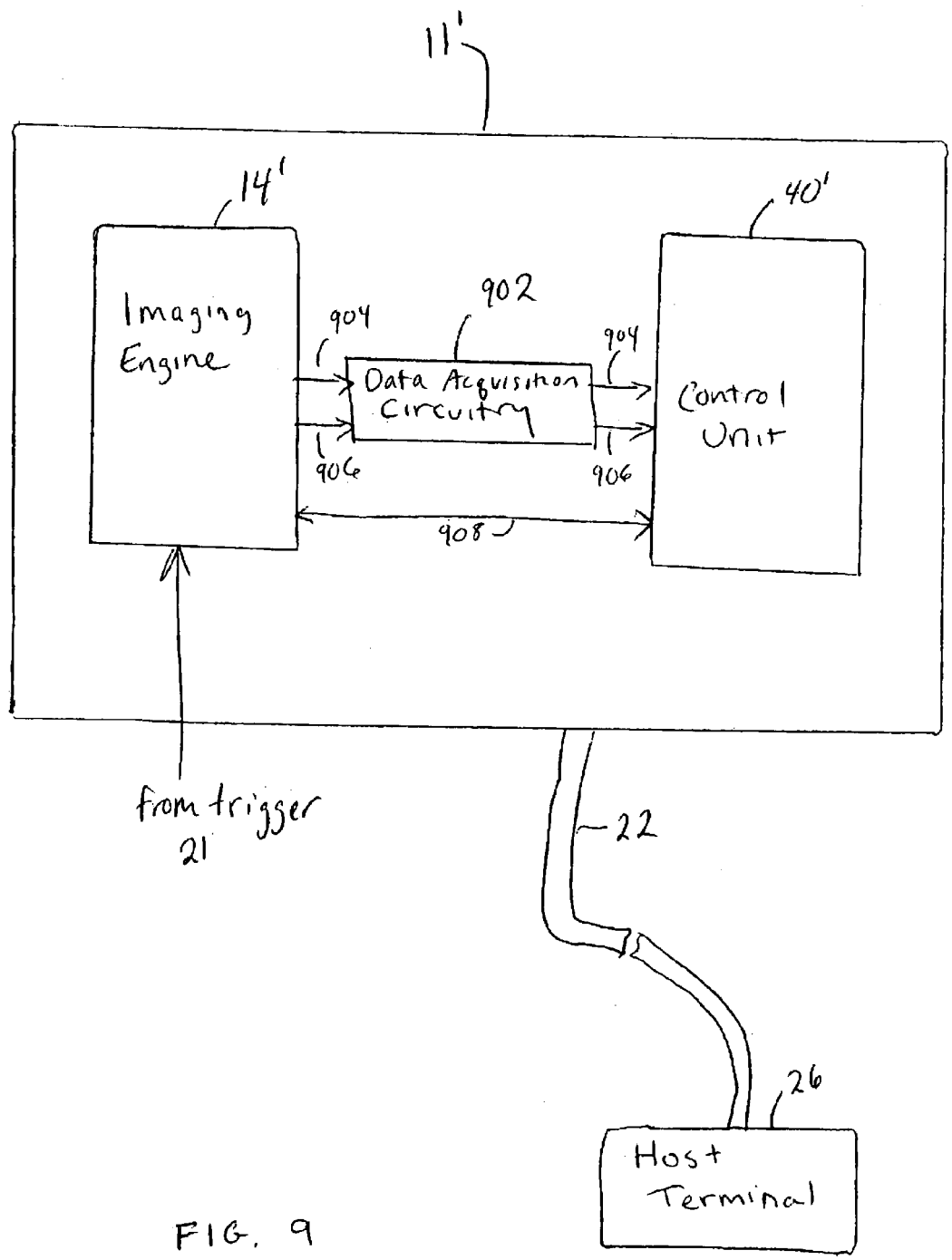
FIG. 9 is a block diagram of the optical code reader illustrated in FIG. 8.

FIG. 9 is a block diagram of the reader 11', which includes the imaging engine 14', data acquisition circuitry 902 and a control unit 40' having a processor (not shown). Control unit 40', similar to control unit 40 of FIG. 3, may further include a microcontroller (not shown) for exchanging control signals 908 with the imaging engine 14'. The imaging engine 14' is responsive to control signals generated by the control unit 40', host terminal 26 and/or an actuating means such as trigger 21', to image an optical code and an object associated with the optical code positioned in a field of view currently aimed at by the imaging engine 14', and to generate optical code image data 904 and object image data 906, respectively. The imaging of the object and the optical code may be performed by performing two imaging operations for individually imaging and generating the object image data and the optical code image data. In another embodiment, the object and optical code are imaged in one imaging operation, and the optical code image data 904 may be extracted from the object image data 906. Imaging of the object and optical code may be performed simultaneously or sequentially. First and second imaging engines may be provided for imaging the object and optical code, respectively.

Data acquisition circuitry 902 performs processing, such as filtering and digitizing, the optical code image data 904 and object image data 906, and provides the optical code image data 904 and object image data 906 to control unit 40' and/or host terminal 26 for processing thereof. Data acquisition circuit 902 is similar to the portion of the data acquisition circuit 515 of FIG. 5 that processes the data output by the imaging engine 14. The data acquisition circuit 902 may be integrated onto a CCD circuit board having a CCD photo sensor array. Further, interface circuitry (not shown) may be provided within the reader 11' and/or the host terminal 26 for interfacing between the imaging engine 14 and the control unit 40' and/or the host terminal 26. It is contemplated that the reader 11' does not include a processor, and that the optical code image data 904 and the object image data 906 are transmitted via cable 22 to host terminal 26 for processing.

Figure 10:
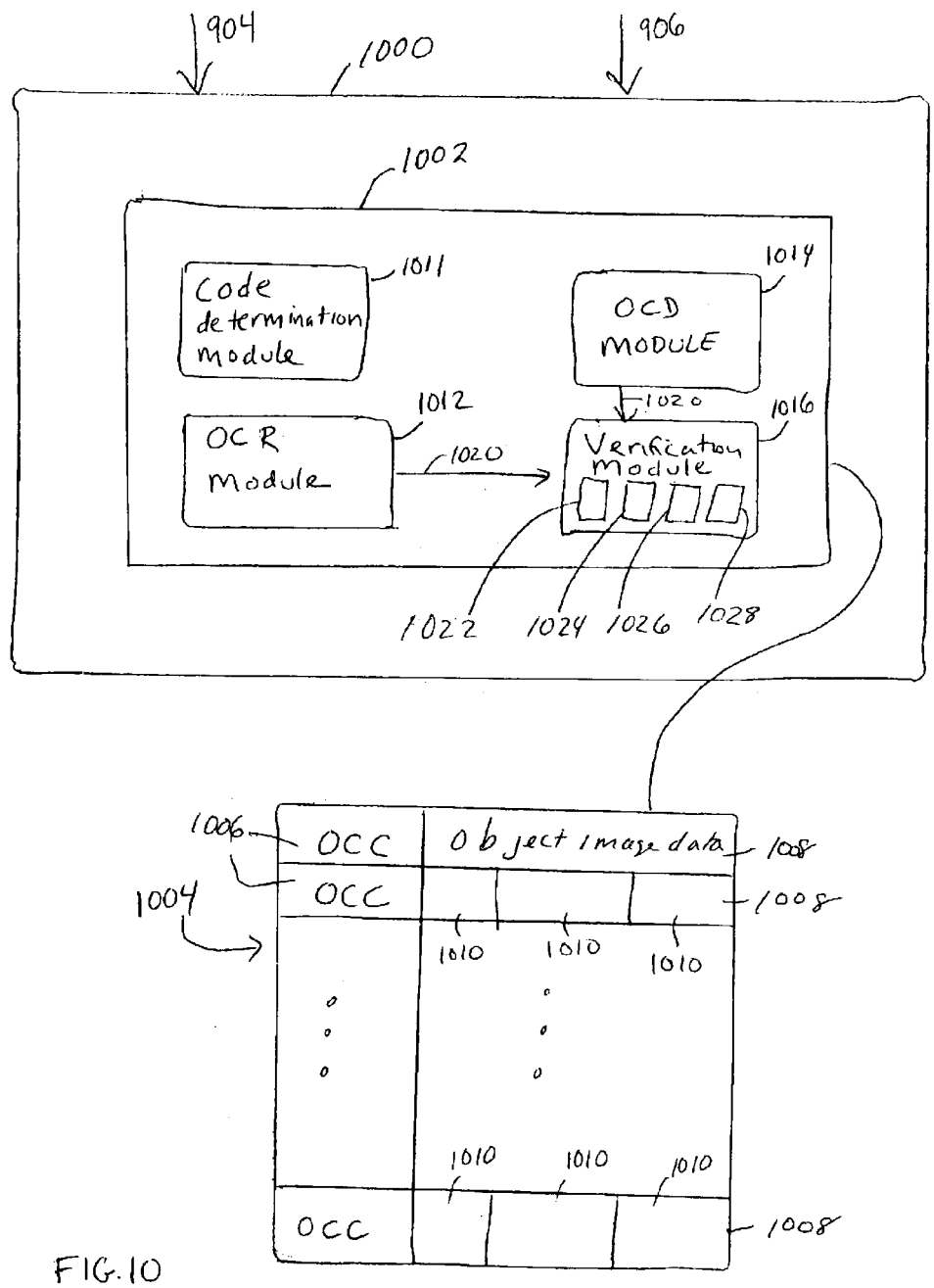
FIG. 10 is a block diagram of a processing component of the optical code reader system illustrated in FIG. 8.

In FIG. 10, processing component 1000 is shown including processor 1002 having one or more processors, where processing component 1000 is included in control unit 40' and/or host terminal 26. Processor 1002 may include multiple processors. Furthermore, processor 1002 has access to an optical code (OC) database 1004, which is similar to database 602 of FIG. 6. Database 1004 stores a plurality of textual codes 1006 for indexing the database 1004 (wherein database 602 stores a plurality of RFID codes for indexing database 602, and wherein it is contemplated that the textual codes 1006 may be the same as the RFID codes) and respective associated object image data entries 1008 or links thereto, similar to the associated image data 605 of FIG. 6, where each associated object image data entry 1008 represents an object assigned the respective textual code. The stored associated object image data entry 1008 preferably include one or more image sub-entries 1010, such as a sub-entry for each side, view, or face (or major faces (e.g., front and back)) of the object.

Further provided are an OCR module 1012 and a verification module 1016, each of which are a software module including a set of programmable instructions capable of being executed by processor 1002. It is noted that the series of programmable instructions corresponding to one or more of the modules described herein can be stored on a computer-readable medium, such as a CD, smart card, 3.5" diskett, etc, or transmitted via propagated signals.

OCR module 1012 receives the optical code image data 904 and processes the optical code image data 904 using an OCR algorithm, and generates at least one textual code 1020 that corresponds to the optical code image data 904. The OCR module 1012 recognizes individual symbols and/or characters included in a string of symbols and/or characters that are included in the imaged optical code. Non-ideal conditions, such as design, print quality, cleanliness, placement, flatness, illumination etc. of the optical code, as well as image noise, distortion, etc., may cause a typical OCR algorithm to have difficulty differentiating between several interpretations for generating the at least one textual code 1020. In a preferred embodiment, the OCR module 1012 generates a list of most probable textual codes 1020, preferably together with respective estimated accuracy score, such as an estimated probability score and/or qualitative score. Alternatively, a single most probable textual code 1020 may be selected.

Verification module 1016 receives the at least one textual code 1020 and the object image data 906, compares the object image data 906 to associated object image data entries 1008 corresponding to stored textual codes 1006 substantially matching the at least one textual code 1020, and determines if a substantial match exists or which is the best match in accordance with correlation criteria. The verification module 1016 includes a query module 1022, which is similar to query module 604 of FIG. 6, which queries the OC database 1004 for retrieving object image data entries 1008 that corresponds to the one or more optical codes 1020. The verification module 1016 further includes a comparator module 1024 similar to comparator module 608 of FIG. 6, which compares the object image data 906 and the associated object image data entries 1008 for determining if a substantial match exists or the best match in accordance with correlation criteria of the verification module 1010, such as by determining if the comparison results are within a predetermined image recognition certainty threshold.

The verification module 1016 preferably includes a face determination module 1026, which is similar to face determination module 612 of FIG. 6, which analyzes the object image data 906 (or, when there is more than one image, each respective image thereof) to determine which associated object image data entry 1008 has image sub-entries 1010 best correlating to a face(s) of the object best imaged by the reader 11', such as correlating to a dominant face of the object imaged by the reader 11'.

The verification module 1016 further preferably includes extract data module 1028, similar to extract data module 616 of FIG. 6, which extracts information from the object image data 906 and/or the associated object image data entries 1008 for comparison thereof. The object image data entries 1008 may already include extracted data. In one embodiment, the comparator module 1024 performs sufficient recognition processing for recognizing similarities between the object image data 906 and the associated object image data entries 1008, such that the extract data module 1028 and the face determination module 1026 can be omitted.

The textual code 1006 associated with the correlated or best correlated associated object image data entry 1008 is determined to be the textual code 1006 that is associated with the object for identifying the object. If none of the associated object image data entries 1008 compared to the object image data 906 correlates to the object image data 906, then the verification module 1016 determines that a misread or no read has occurred.

In one embodiment, the optical code reader system 10' is capable of verifying optical code reads and RFID reads. Accordingly, the optical code reader system 10' system includes RFID reader circuitry 1001 similar to the RFID reader block 12 shown in FIG. 1, for performing an RFID read by receiving RFID tag data from an RFID tag, and providing the RFID tag data to the processor 1002. The reader 11' includes imaging engine 14', having an image sensor, for imaging an image of an object and generating object image data 906 and selectably reading an optical code associated with the object by imaging the optical code and generating optical code image data 904. Database 1004 stores a plurality of digital code sets, such as textual code 1006, having at least one digital code and the object image data entry 1008 associated with a digital code set of the plurality of digital code sets, wherein the object image data entry 1008 associated with the digital code set of the plurality of digital code sets represents at least one image of an object that is assigned the at least one digital code of the digital code set. Processor 1002 receives and processes at least two of the RFID tag data, the object image data, and the optical code image data.

The processor 1002 includes an RFID decoding module 1014 for decoding the RFID tag data and generating at least one first digital code, and a code generation software module, such as OCR 1012, for processing the object code image data and generating at least one second digital code, such as textual code 1020. Database query module 1022 accesses the database 1004 and retrieves at least one object image data entry 1008 associated with at least one stored digital code set that includes a digital code that substantially matches at least one of the at least one first digital code and the at least one second digital code. Comparator module 1024 compares the object image data with the at least one retrieved object image data entry 1008. If an object has both an optical code and an RFID tag associated with it, the optical code reader system 10' may read and verify both the RFID tag and the optical code. In most applications, typically a same textual code is associated with the RFID tag and the optical code upon decode.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A system for reading an optical code and verifying the read optical code comprising:

an imaging engine having an array of image sensors for sensing an image of an object and an optical code associated with the object and generating respective object image data and optical code image data;

a database storing a plurality of digital codes and an object image data entry associated with respective digital codes of the plurality of digital codes, wherein the object image data entry associated with a digital code of the plurality of digital codes represents at least one image of an object that is assigned the digital code; and a processing unit for receiving the object image data and the optical code image data from the imaging engine, said processing unit comprising:

a code generation software module using one decoding method for generating one set of at least one digital code that corresponds to the optical code image data;

a database query module for accessing at least one object image data entry stored in the database associated with at least one respective stored digital code that substantially matches the respective one set of at least one generated digital code; and a comparator module for comparing the generated object image data with the at least one accessed object image data entry.

2. The system according to claim 1, wherein the optical code image data is extracted from the object image data.

3. The system according to claim 1, wherein the imaging engine images the optical code during a first imaging operation and generates the optical code image data and images the object during a second imaging operation and generates the object image data.

4. The system according to claim 1, wherein the stored object image data entry associated with a digital code of the plurality of stored digital codes includes non-image data indicative of at least one characteristic of the object assigned the digital code.

5. The system according to claim 1, wherein the stored object image data entry associated with a digital code of the plurality of stored digital codes includes data extracted from an image of the object assigned the digital code.

6. The system according to claim 1, wherein the stored object image data entry associated with a digital code of the plurality of stored digital codes includes a plurality of image sub-entries; and respective image data sub-entries correspond to different views of the object assigned the digital code.

7. The system according to claim 1, wherein the processing unit further comprises a face determination module for determining data of the generated object image data corresponding to at least one face of the object imaged by the imaging engine.

8. The system according to claim 1, wherein the processing unit further comprises a data extraction module for extracting data from the generated object image data.

9. The system according to claim 8, wherein the extracted data is indicative of at least one characteristic of the object imaged by the imaging engine.

10. The system according to claim 1, wherein the code generation software module includes an optical character recognition (OCR) software module for performing optical character recognition processing on the optical code image data for generation of the one set of at least one digital code.

11. The system according to claim 1, wherein the code generation software module further generates an estimated accuracy score associated with respective generated digital codes of the one set of at least one digital code.

12. The system according to claim 10, wherein the generated one set of at least one digital code includes a textual code.

13. The system according to claim 1, wherein the comparator module determines if the comparison results are within a predetermined image recognition certainty threshold.

14. A method for verifying an optical code read comprising the steps of:

receiving optical code image data and object image data associated with the optical code read and an object associated with the optical code, respectively;

generating one set of at least one digital code in accordance with the optical code image data using one decoding method;

querying a database for accessing at least one stored object image data entry associated with at least one stored digital code that substantially matches the one set of at least one generated digital code;

comparing the received object image data with the at least one accessed object image data entry; and wherein the at least one accessed object image data entry includes data indicative of at least one characteristic of the object assigned the matching stored digital code;

further including the step of extracting from the received object image data, data indicative of at least one characteristic of the object imaged by the imaging engine; and the comparing step includes comparing the data indicative of the at least one characteristic of the respective at least one accessed object image data entry and the received object image data.

15. The method according to claim 14, wherein the generating step includes the step of performing optical character recognition on the received optical code image data for generating the one set of at least one digital code.

16. The method according to claim 14, further including the step of generating an estimated accuracy score associated with respective generated digital codes of the at least one digital code.

17. The method according to claim 14, wherein the generated one set of at least one digital code includes a textual code.

18. The method according to claim 14, further comprising the step of determining if the comparison results are within a predetermined image recognition certainty threshold.

* * * * *